United States Patent [19]

Imai et al.

[11] Patent Number: 4,834,045
[45] Date of Patent: May 30, 1989

[54] ENGINE CONTROL SYSTEM

[75] Inventors: Shoji Imai; Mitsuru Nagaoka; Toshihiro Matsuoka; Kazutoshi Nobumoto, all of Hiroshima, Japan

[73] Assignee: Mazda Motor Corporation, Hiroshima, Japan

[21] Appl. No.: 68,616

[22] Filed: Jul. 1, 1987

[30] Foreign Application Priority Data

| Jul. 1, 1986 [JP] | Japan | 61-152647 |
| Jul. 1, 1986 [JP] | Japan | 152648 |
| Jul. 1, 1986 [JP] | Japan | 61-152649 |

[51] Int. Cl.$^4$ ................................ F029 9/00
[52] U.S. Cl. ................. 123/352; 123/361; 123/399
[58] Field of Search .......... 123/352, 350, 361, 396, 123/399; 180/335

[56] References Cited

U.S. PATENT DOCUMENTS

| 4,419,973 | 12/1983 | Collonia | 123/361 |
| 4,505,357 | 3/1985 | Pfalzgraf et al. | 123/361 |
| 4,519,361 | 5/1985 | Murakami | 123/361 |
| 4,640,246 | 2/1987 | Sturdy | 123/361 |
| 4,671,235 | 6/1987 | Hosaka | 123/399 |
| 4,691,676 | 9/1987 | Kikushi | 123/361 |
| 4,691,677 | 9/1987 | Hotata et al. | 123/361 |

Primary Examiner—Raymond A. Nelli
Attorney, Agent, or Firm—Fleit, Jacobson, Cohn & Price

[57] ABSTRACT

The engine control system of the present invention comprises an engine output changing device for controlling an engine output of at least one of engine power, engine, engine torque and engine speed. At least two controls for controlling the engine output changing device are selected from a direct control device for directing detecting an actual value to which the engine output changing device is operated. A target value for the engine output changing device is set based on an amount an accelerator is operated to thereby adjust the engine output changing device to eliminate a difference between the actual value and the target value. A vehicle speed control device for detecting an actual vehicle speed, setting a target value of vehicle speed based on the amount the accelerator is operated, and for controlling the engine output changing device, and an acceleration control device for detecting a change in an actual vehicle speed, setting a target value of vehicle acceleration based on the amount the accelerator is operated, and for controlling the engine output changing device, are also provided. A selecting device is used to select one of the direct control, vehicle speed control and acceleration control devices in accordance with a vehicle running condition.

19 Claims, 17 Drawing Sheets

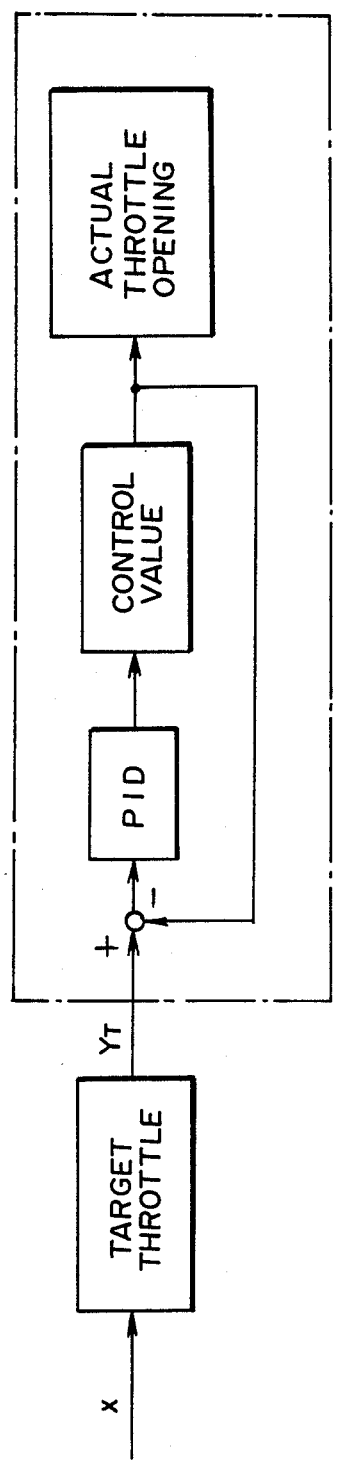

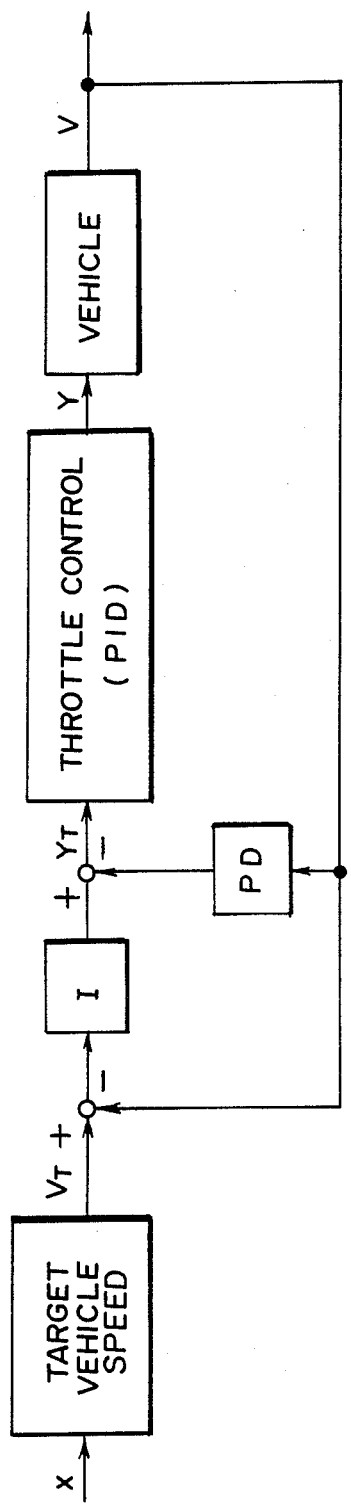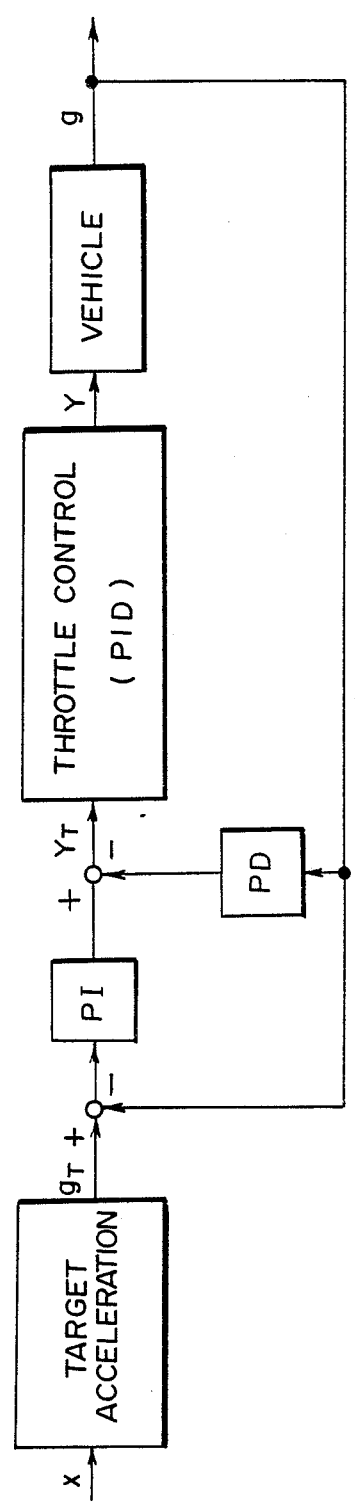

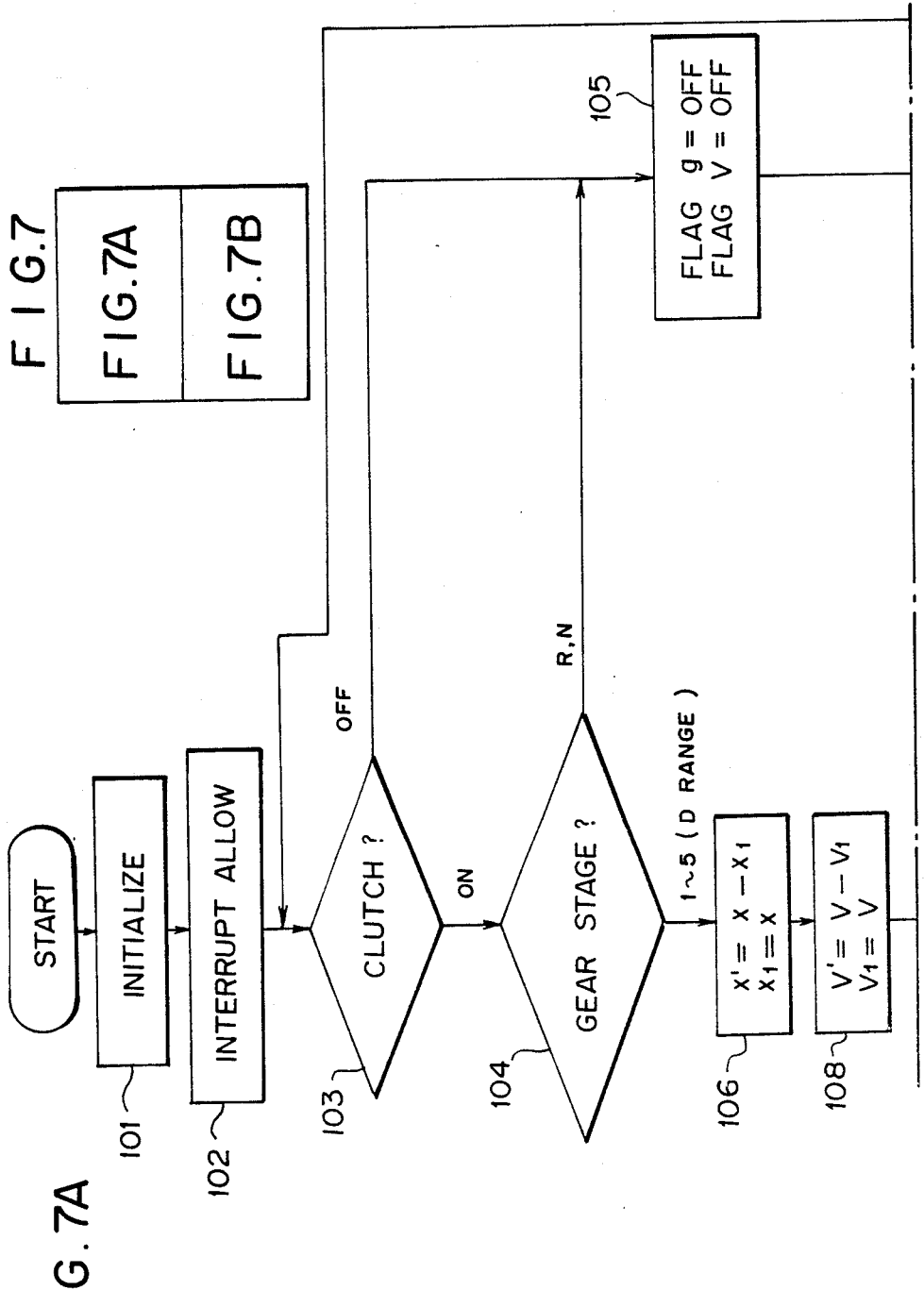

F I G. 11
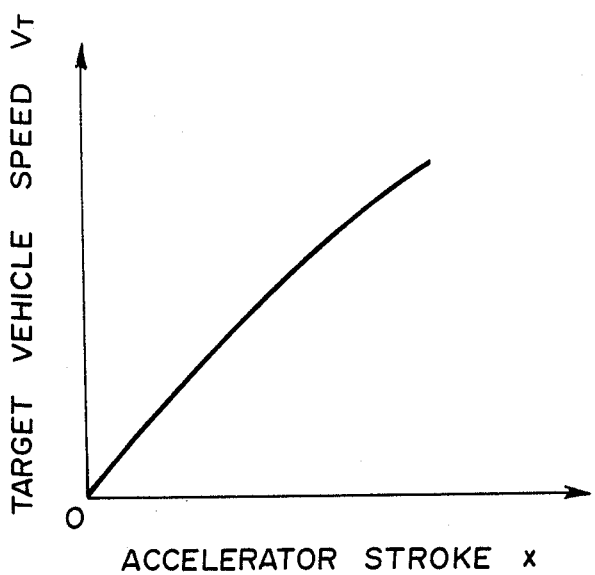
F I G. 12
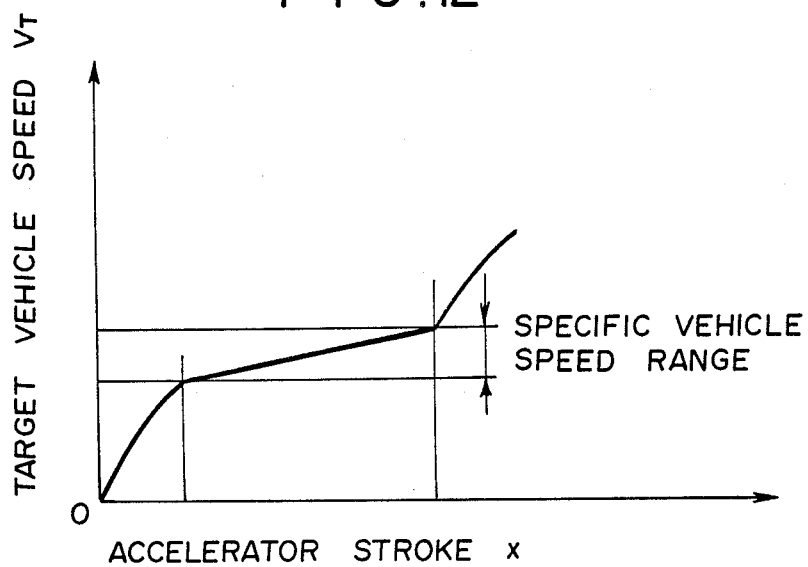

ENGINE CONTROL SYSTEM

BACKGROUND OF THE INVENTION

The present invention relates to an engine control system of a vehicle, particularly to a control system for controlling an engine output in relation to a driver's operation of an accelerator under various engine operating conditions.

DESCRIPTION OF THE PRIOR ART

In a common structure of a vehicle, a accelerator is mechanically linked with a throttle valve so as to actuate the throttle valve proportional to an operation amount of the accelerator. It will be understood that the relationship between the operation amount of the accelerator and the throttle valve opening is constant regardless of the engine operating condition and therefore it is impossible to change the relationship between the operation amount of the accelerator and the amount of the throttle valve opening in accordance with the engine operating condition. In this regard, there have been proposed various throttle control methods for electrically controlling the throttle valve opening based on an operation amount of the accelerator in accordance with a certain property. Alternatively, there is shown in Japanese Patent Public Disclosure No. 60-111029, laid open to the public on June 17, 1985, a throttle valve control method for controlling the throttle valve opening in response to the operation amount of the accelerator so as to provide a vehicle with a desirable speed.

In the engine as disclosed in the Japanese Patent application, the throttle valve is controlled so as to accomplish a target speed of the vehicle so that running stability can be obtained under a constant operating condition and a constant vehicle speed operation can be readily accomplished. It should, however, be noted that this control system cannot obtain a desirable quick or smooth response properly to the operation of the accelerator under a transient operating condition such as accelerating or decelerating conditions. On the other hand, in the control system in which the amount of the throttle valve opening is determined in accordance with the amount of the accelerator operation, a preferable response to the change in the engine operating condition can be obtained. However, it is difficult to obtain an appropriate response to a change in a vehicle running condition such as a change in a running resistance against the vehicle. Therefore, when the running resistance is changed during operation, a driver must meet the change by operating the accelerator.

SUMMARY OF THE INVENTION

It is therefore an object of the present invention to provide an engine control system by which a desirable control of an engine output quantity can be accomplished.

It is another object of the invention to provide an engine control system in which an appropriate control property is selected for controlling the throttle valve opening in accordance with a vehicle running condition.

It is a further object of the invention to provide an engine with an improved response property in a transient running condition such as accelerating and decelerating conditions.

It is still a further object of the invention to provide an engine of a stable operability in a substantially constant engine operating condition.

According to the present invention, the above and other objects can be accomplished by an engine control system comprising at least two direct control means for directly calculating control values for an engine output changing means based on the amount the accelerator is operated to thereby control the engine output changing means, a vehicle speed control means for setting a target value of vehicle speed based on the operation amount of the accelerator for controlling the engine output changing means so as to adjust the vehicle speed to the target value, and an acceleration control means for setting a target value of vehicle acceleration for controlling the engine output changing means so as to adjust the vehicle acceleration to the target value, and selecting means for selecting one of the direct control means, vehicle speed control means and acceleration control means in accordance with an vehicle running condition.

The engine output changing means is preferably adapted to drive a throttle valve so that an engine output is changed. The throttle valve opening is controlled by the direct control means, vehicle speed control means and acceleration control means.

The vehicle running condition takes into account various road conditions and various friction coefficients. Snowy road, rainy road different gradients of the road, various engine operating conditions produced by a driver through an operation of the accelerator and the like are taken into account.

According to the present invention, there are provided direct control means in which a target value of engine output changing means such as a throttle valve opening is set based on the accelerator stroke to control the engine output chaging means so as to adjust the throttle valve opening to the target value, a vehicle speed control means in which a target value of the vehicle speed is set based on the accelerator stroke to control the changing means so as to adjust the vehicle speed to the target value, and an accelerator control means in which a target value of the vehicle acceleration is set based on the acceleration stroke to control the changing means so as to adjust the vehicle acceleration to the target value. One of the three control means is selected in accordance with a vehicle running condition.

It should be noted that the engine output changing means is not necessarily throttle value. This means can be any means which is adapted to control factors which influence the engine output. Accordingly, the construction of the engine output control means depends on the type of the engine. For instance, in a diesel engine, the amount of the fuel injection is controlled in order to control the engine output so that the engine output control means can be constituted by a fuel control system.

The effect of the present invention can be obtained by providing at least two control means among the control means, vehicle speed control means and acceleration control means.

The above and other objects and feartures of the present invention will become apparent from the following description of preferred embodiments taking reference to the accompanying drawings.

BRIEF DESCRIPTION OF THE DRAWINGS

FIG. 3 is a block chart of a throttle control system;

FIG. 4 is a block chart of a vehicle speed control system;

FIG. 5 is a block chart of an acceleration control system;

FIGS. 7, 7A and 7B are a flow chart of a main program;

FIG. 11 and FIG. 12 are maps showing a target value of the vehicle speed $V_T$ and the accelerator stroke x;

DESCRIPTION OF THE PREFERRED EMBODIMENTS

Figure 1:
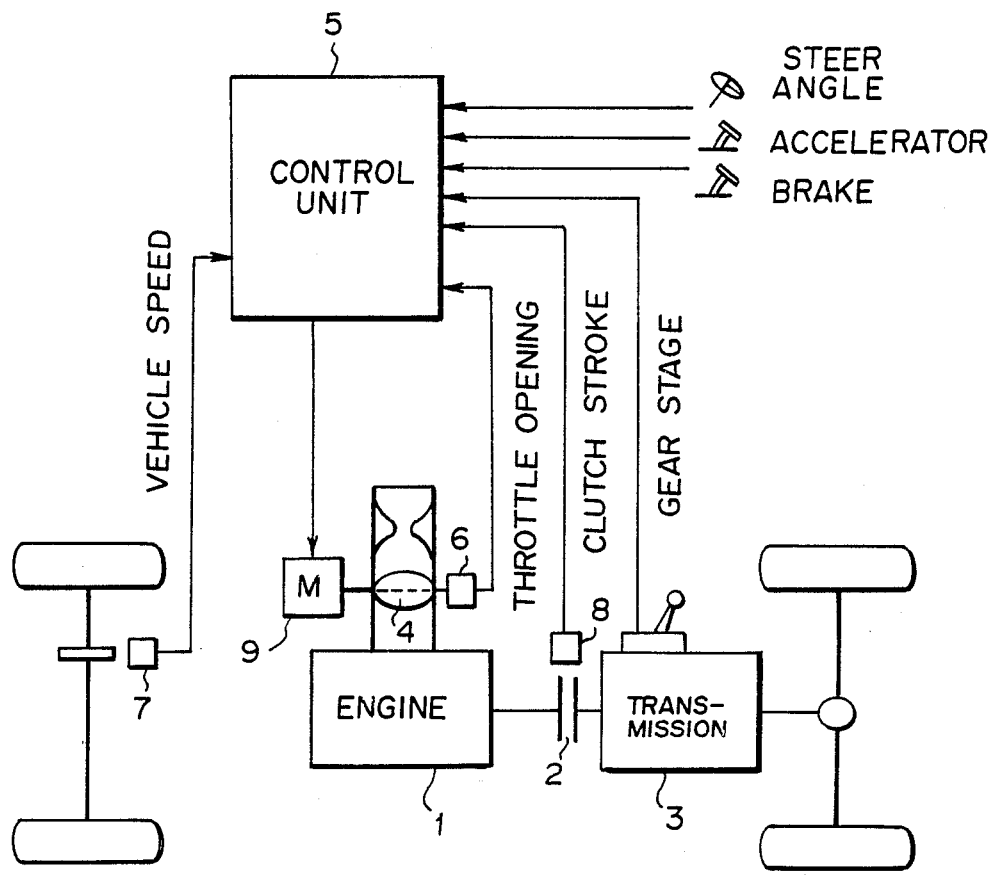
FIG. 1 is a schematic diagram of an engine control system in accordance with one embodiment of the present invention.

Now referring to FIG. 1, there is shown a schematic view of an engine 1 in accordance with a preferred embodiment of the present invention. The engine 1 is connected through a clutch device 2 with a transmission 3. An intake system of the engine 1 is provided with a throttle valve 4 which is driven by a DC motor 9. The engine 1 is further provided with a control unit 5 including a micro computer, a throttle opening sensor 6, a vehicle speed sensor 7 and a clutch stroke sensor 8. The control unit receives signals denoting a stroke x of an accelerator 11, a throttle valve opening y from the throttle opening sensor 6, a vehicle speed V from vehicle speed sensor 7, a clutch stroke from clutch stroke sensor 8, a gear stage or shift position from the transmission 3, a steered angle, a braking operation and the like so as to produce signals for actuating the motor 9 to thereby control the throttle valve 4.

In the illustrated embodiment, there is provided a throttle control system in which a target value $y_T$ of the throttle valve opening is set based on the accelerator stroke to control the throttle valve 4 so as to adjust the throttle valve opening to the target value $y_T$, a vehicle speed control system in which a target value $V_T$ of the vehicle speed is set based on the accelerator stroke to control the throttle valve 4 so as to adjust the vehicle speed to the target value $V_T$, and an acceleration control system in which a target value $g_T$ of the vehicle acceleration is set based on the acceleration stroke to control the throttle valve 4 so as to adjust the vehicle acceleration to the target value $g_T$. One of the three control systems is selected in accordance with a vehicle running condition to be functioned.

Figure 2:
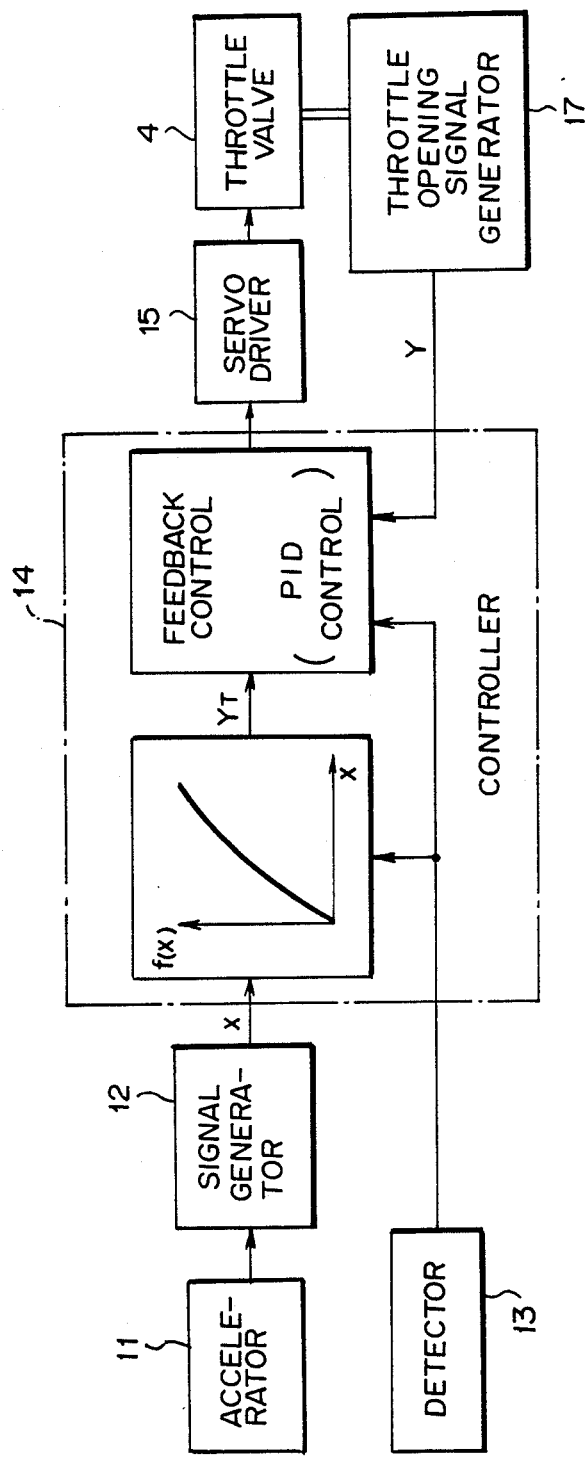
FIG. 2 is a block diagram showing a relationship among various control means.

There is shown a block diagram of the control system in FIG. 2.

When the accelerator 11 is operated, a signal generator 12 detects a stroke x of the accelerator operation to produce a signal corresponding to the stroke x. A detector 13 detects an engine operating condition, a gear stage of the transmission 3 and the like to produce signals for denoting them. A controller 14 corresponding to the control unit FIG. 1 carries out a gain property control action for controlling a gain property f(x) of the throttle opening predetermined in response to the accelerator stroke x and a phase property control for feedback-controlling a phase or response speed of the throttle opening gain property f(x) to the accelerator stroke x. In the gain property control action, the controller 14 controls the gain for the throttle opening f(x) in response to the accelerator stroke x on the basis of signals from the condition detector 13 and sets a target value $y_T$ of the throttle opening. It should be noted that a powerful feeling in the running condition can be obtained under an increased gain, while a gentle feeling under a decreased gain. In the phase property control, the controller 14 controls the phase of the throttle opening f(x) in response to the accelerator stroke x based on the signal generator 12. A servo driver 15 corresponding to the DC motor 9 of FIG. 1 drives the throttle valve 4 in accordance with a control signal produced by the controller 14. A throttle opening signal generator 17 corresponding to the throttle opening sensor 6 detects an actual throttle opening y to produce a signal corresponding to the value y. The controller 14 carries out a feedback control so as to accord the actual throttle opening y with the target value $y_T$. This control action is of a PID control action of which block diagram is illustrated in FIG. 3. The PID control action combines a proportional, integral and derivative control actions so as to obtain a quick respense property of the feedback control. In this throttle valve control, a target value $y_T$ of the throttle valve opening is determined based on an accelerator stroke x. The throttle valve target value $y_T$ is provided by following equation (1) wherein $G_1$, $G_2$ and $G_3$ indicate a proportional gain, integral gain and derivative gain respectively.

$$y_T = G_1(y_T - y) + G_2 \int (y_T - y) dt + G_3 (y_T - y)' \quad (1)$$

Differentiating $y_T$, $$y_T' = G_1(y_T - y)' + G_2(y_T - y) + G_3(y_T - y)'' \quad (2)$$

Setting the throttle valve opening deviation $y_T - y = EN$ in the current cycle, the throttle valve opening deviation EN1 in the preceeding cycle and the throttle valve opening deviation EN2 in the before-preceeding cycle, from the equation (2), $$y_T' = G_1 * (EN - EN1) + \quad (3)$$
$$G_2 * EN + G_3 * \{(EN - EN1) - (EN1 - EN2)\} =$$
$$G_1 * (EN - EN1) + G_2 * EN + G_3 * (EN - 2 * EN1 + EN2)$$

In this control, the movement of the throttle valve corresponds to the action of the accelerator so that the engine output can be readily controlled to thereby provide driver comfort. Since the PID control is highly responsive, it is appropriate for a slight acceleration or deceleration such as a starting action, a gear stage shifting action and the like.

Now referring to FIG. 4, there is shown a block chart of a vehicle speed control mode in which a target vehicle speed $V_T$ is set based on an accelerator stroke x and a target throttle opening $y_T$ is set by means of an I-PD control action. The throttle control based on the accelerator stroke x is the same PID control action as that in FIG. 3.

A target value $y_T$ of throttle valve opening in the vehicle speed control can be expressed by the following equation (4) wherein $G_4$, $G_5$, and $G_6$ indicate an integral gain, proportional gain and derivative gain respectively.

$$y_T = G_4 \int (V_T - V)dt - G_5(V_T - V) - G_6(V_T - V)' \quad (4)$$

Differentiating $y_T$, $$y_T' = G_4(V_T - V) - G_5(V_T - V)' - G_6(V_T - V)'' \quad (5)$$

Setting the vehicle speed deviation $V_T - V = ENV$ in the current processing cycle, the deviation ENV1 in the preceding cycle, and deviation ENV2 in the before-preceding cycle, from the equation (5), $$y_T' = G_4 * ENV - G_5 * (ENV - ENV1) - \quad (6)$$
$$G_6 * \{(ENV - ENV1) - (ENV1 - ENV2)\} =$$
$$G_4 * ENV - G_5 * (ENV - ENV1) -$$
$$G_6 * (ENV - 2 * ENV1 \div ENV2)$$

The I-PD control action is not responsive in comparison with the PID control action, however it has a stable response property against an external disturbance so that it is appropriate for a phase property control. That is, even when the vehicle running condition changes because of an external disturbance such as resistance to the running operation, the time for reaching the desired vehicle speed is substantially constant so that a stable running feeling can be obtained.

Referring to FIG. 5, there is shown a block chart of an acceleration control mode in which a target acceleration $g_T$ is set based on an accelerator stroke x and a target throttle opening $y_T$ is set by means of an PI-PD control action. The throttle control based on the accelerator stroke x is the same PID control action as that in FIG. 3.

A target value $y_T$ of the throttle valve opening in the acceleration control can be expressed by the following equation (7) wherein $G_7$, $G_8$, $G_9$ and $G_{10}$ indicate a proportional gain, integral gain, proportional gain and derivative gain respectively.

$$y_T = G_7(g_T - g) + G_8 \int (g_T - g)dt - G_9(g_T - g) - G_{10}(g_T - g)' \quad (7)$$

Differentiating $y_T$, $$y_T' = G_7(g_T - g)' \div G_8(g_T - g) - G_9(g_T - g)' - G_{10}(g_T - g)'' \quad (8)$$

Setting the acceleration deviation $V_T - V = ENG$ in the current processing cycle, the deviation ENG1 in the preceding cycle, and deviation ENG2 in the before-preceding cycle, from the equation (8), $$y_T' = G_7 * (ENG - ENG1) \div \quad (9)$$
$$G_8 * ENG - G_9 * (ENG - ENG1) -$$
$$G_{10} * \{(ENG - ENG1) - (ENG1 - ENG2)\} =$$
$$G_7 * (ENG - ENG1) \div G_8 * ENG - G_9 * (ENG - ENG1) -$$
$$G_{10} * (ENG - 2 * EN \div ENG2)$$

The PI-PD control action is of an intermediate feature between the PID control action and The I-PD control action, and the PI-PD control is advantageous in both stability and response so that it is appropriate for the acceleration control.

Figure 6:
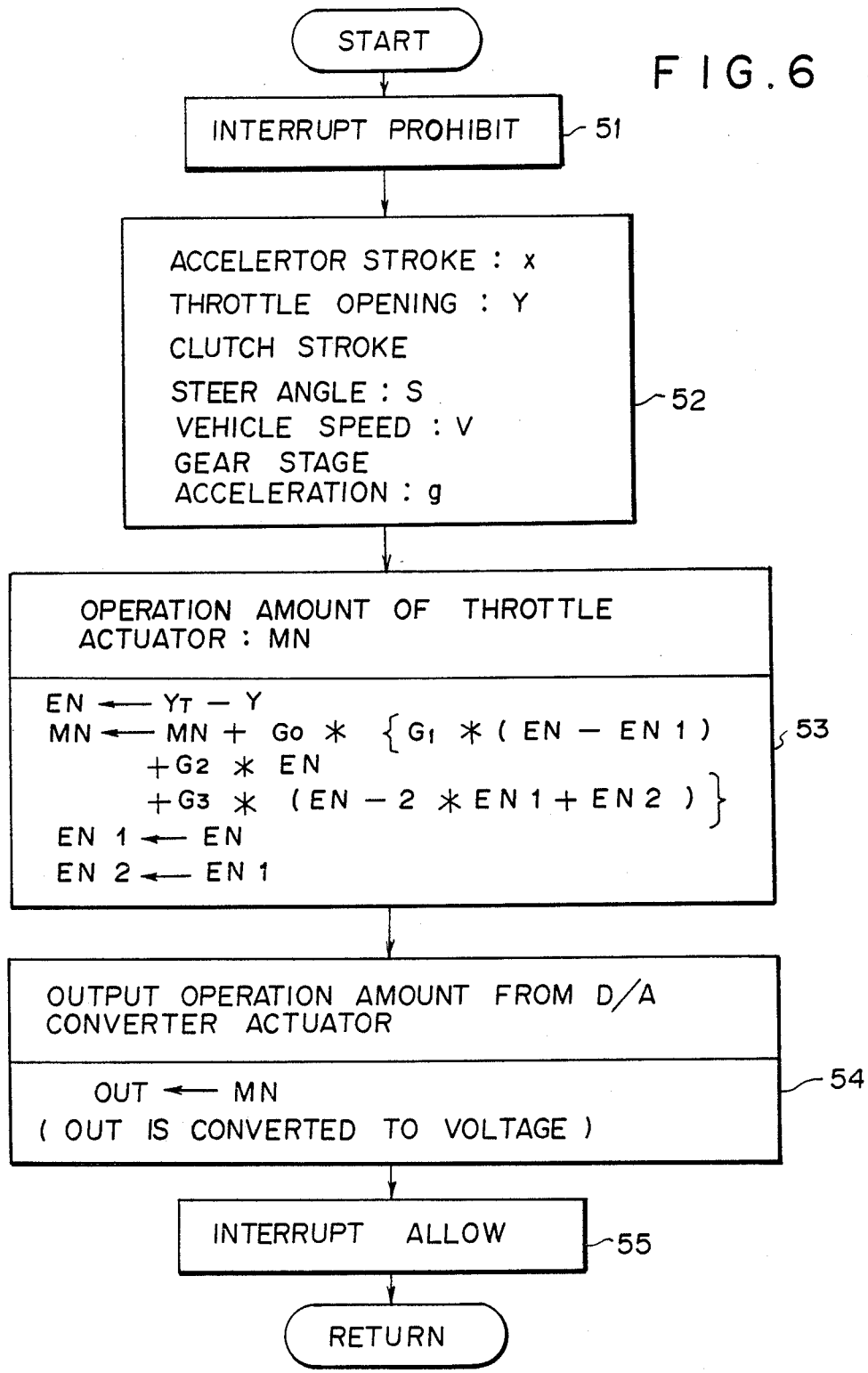
FIG. 6 is a flow chart of an interrupt routine for determining a control value of a throttle actuator.

In FIG. 6, there is shown a flow chart of an interrupt program for providing a throttle actuator or DC motor with a control variable.

This program is carried out every 10 micro seconds.

In FIG. 6, the controller 14 inhibits an interruption in step 51. In step 52, the controller 14 reads the accelerator stroke x, throttle valve opening y, clutch stroke, steering angle S, vehicle speed V and gear stage, and calculates an acceleration of the vehicle. Then in step 53, the controller 14 calculates a control variable MN the throttle actuator or motor 9 by means of the equation (3) (PID control action)

$$EN \leftarrow y_T - y$$
$$MN \leftarrow MN \div G_0 * \{G_1 * (EN - EN1)$$
$$\div G_2 * EN$$
$$\div G_3 * (EN - 2 * EN1 \div EN2)\}$$
$$EN1 \leftarrow EN$$
$$EN2 \leftarrow EN1$$

$G_0$ represents a control gain of the control system and usually, $G_0 = 1$. For the following processing cycle, the preceding throttle opening deviation EN1 is memory-shifted to EN, and the before-preceding throttle opening deviation EN2 to EN1. The controller 14 outputs the control variable signal MN to the actuator. In this embodiment, the actuator is the DC motor 9 so that the control variable MN is converted to a voltage by a D/A converter in step 54. Finally, the interrupt routine is allowed to interrupt this control process in step 55 to be ended.

Figure 7B:
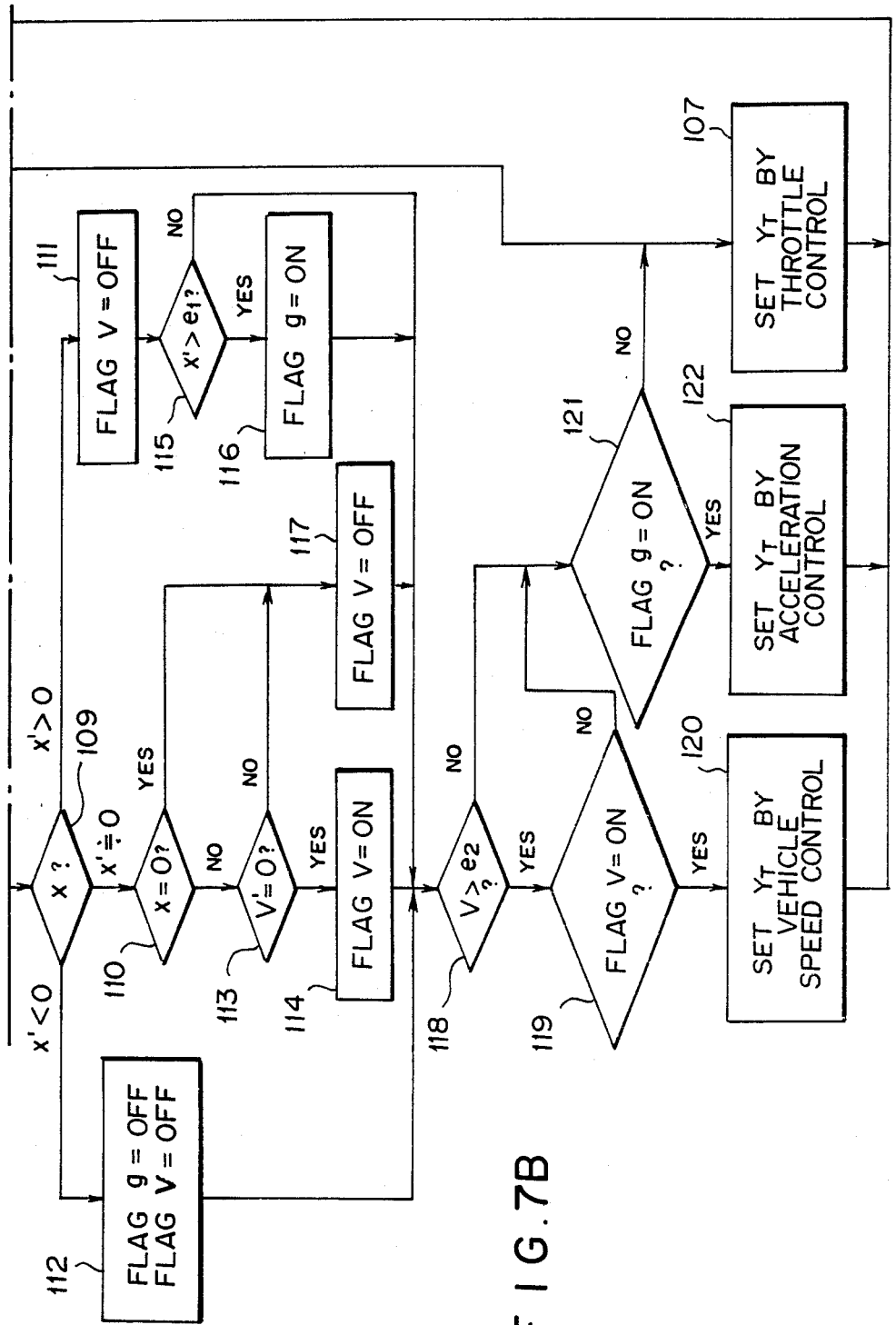

FIG. 7 shows a flow chart of a main program for selecting one control mode among the throttle control mode, vehicle speed control mode and acceleration control mode in accordance with the vehicle running condition.

In FIG. 7, the controller initializes the system in step 101, and the system is allowed to be interrupted in step 102. In step 103, a judgement is made as to whether or not the clutch is connected. When the clutch is engaged, step 104 is carried out. On the other hand, when the clutch is disengaged or half-engaged, step 105 is carried out. In step 104, a judgement is made as to where the gear stage is. Where the gear stage is positioned at one of the 1st through 5th stages of a manual transmission or at the D range of an automatic transmission, step 106 is carried out. Where the gear stage is in the reverse R and neutral N positions, step 105 is carried out. In step 105, an acceleration control flag g and vehicle speed control flag V are cleared OFF and the procedure goes to step 107 in which a desirable or target value $y_T$ of the throttle valve opening is set through the throttle valve control.

In step 106, a difference x' between the current accelerator stroke x and the preceding accelerator stroke $x_1$ is calculated, and the value of the preceding stroke $x_1$ is memory-shifted to an address of the current stroke x.

In step 108, a difference V' between the current vehicle speed V and the preceding vehicle $V_1$ is calculated, and the value of the preceding vehicle speed $V_1$ is shifted to an address of the current vehicle speed V. Thereafter, step 109 is carried out. In the step 109, in the case of the difference x'=0, the procedure goes to step 110. If the difference x'>0, step 111 is carried out and flag V is cleared off, the difference is x'<0, step 112 is carried out, that is, the flag g and flag V are cleared OFF. In step 110, a judgement is made as to whether or not the accelerator stroke x=0. If the result of the judgement is NO, step 113 is carried out in which a judgement is made as to whether the speed difference V'=0. If the judgement is Yes, the controller 14 judges that the operating condition is under a constant vehicle speed condition and makes the flag V ON in step 114. The flag V is cleared OFF in the step 111, thereafter a judgement is made as whether or not the accelerator stroke difference x'>$e_1$ ($e_1$ is predetermined). If the judgement is YES, the controller 14 judges that the vehicle is under an acceleration condition. In connection with the judgement, the flag g is turned ON in step 116. Where the judgement in the step 110 is YES and the judgement in the step 113 is NO, the flag V is cleared off in step 117. Thereafter, step 118 is carried out in which a judgement is made as to whether vehicle speed V>$e_2$ or not. If the result is YES, step 119 is carried out in which a judgement is made as to whether or not the flag V is ON. In the case where the judgement is YES, a target value $y_T$ of the throttle valve opening is set by means of the vehicle speed control system in step 120. If the results are NO in steps 118 and 119, a judgement is made as to whether or not the flag g is ON in step 121. If the judgement is YES, a target value $y_T$ of the throttle valve opening is set by means of the acceleration control system in step 122. If the judgement is NO in the step 121, step 107 is carried out in which a target value $y_T$ of the throttle valve opening is set by means of the throttle control system.

Figure 8:
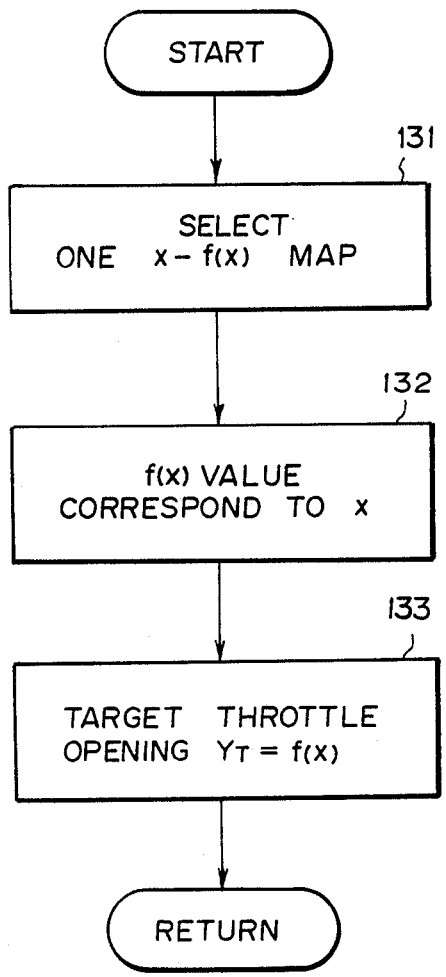
FIG. 8 is a flow chart of the throttle control.
Figure 9:
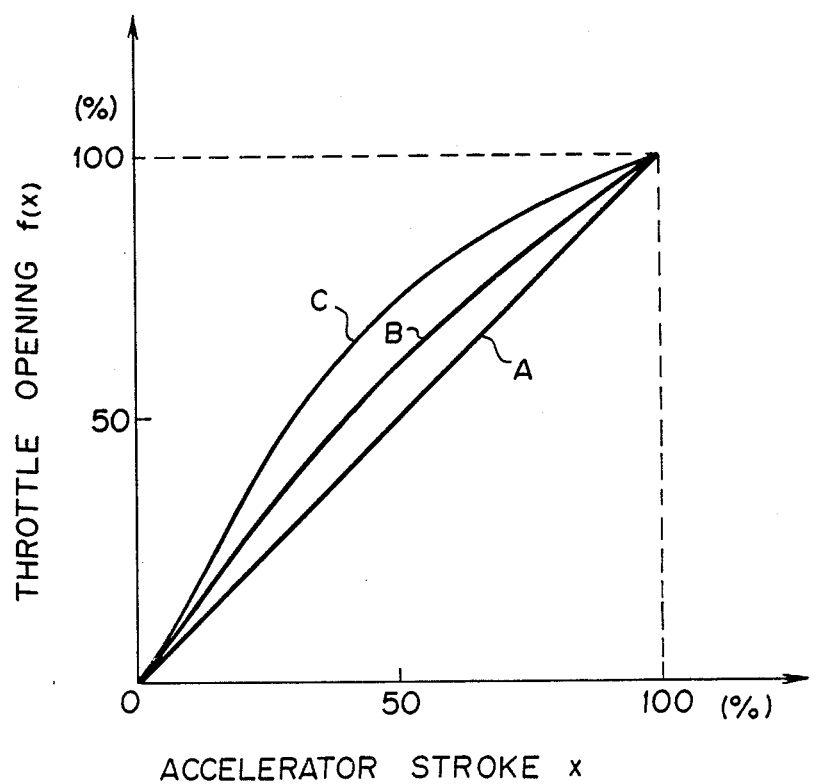
FIG. 9 is a map showing a relationship between the throttle opening f(x) and an accelerator stroke x.

FIG. 8 shows a control flow for determining the target value $y_T$ in accordance with the throttle control system when the step 107 is carried out. In step 131, one control line is selected among control lines showing a relationship between the accelerator stroke x and the throttle valve opening f(x) as illustrated in FIG. 9. In FIG. 9, control line A is provided for a condition of neutral, reverse and 1st through 3rd gear stage. Control lines B, C are provided for 4th and 5th gear stages respectively. When the gear stage is in the 4th or 5th stage, a drive force for wheels is small and a drag force against the vehicle is increased so that a control gain for the throttle valve opening f(x) corresponding to the accelerator stroke x is increased. Thereafter, in step 132, a value of the throttle valve opening f(x) is directly determined in correspondence with a value of the accelerator stroke x by utilizing a control line selected in the step 131. Further in step 133, a target value $y_T$ of the throttle valve opening is determined as $y_T=f(x)$.

Figure 10:
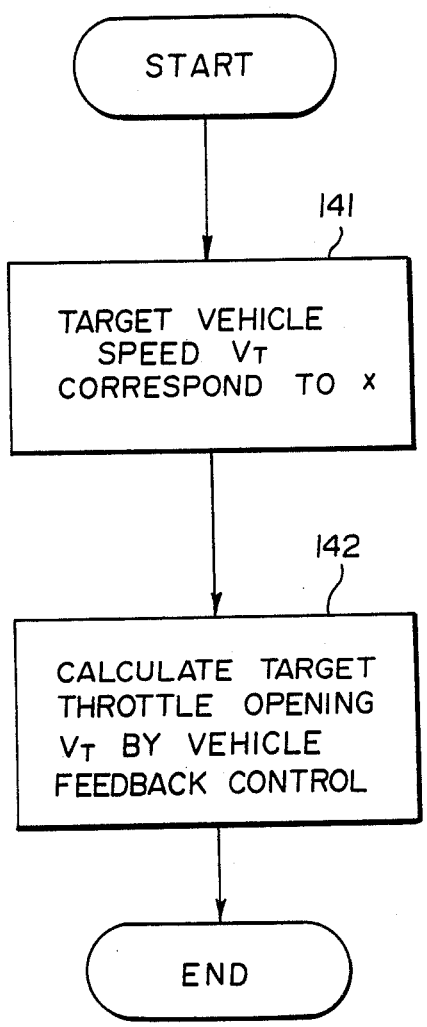
FIG. 10 is a flow chart of the vehicle speed control.

In FIG. 10, there is shown a control flow for determining a target value $y_T$ of the throttle valve opening in accordance with the vehicle control mode in the case where the control flow in FIG. 7 is selected. This control is carried out by utilizing a x-$V_T$ map providing a relationship between the accelerator stroke x and a target vehicle speed $V_T$ as shown in FIG. 11. That is, in step 141, a target value $V_T$ of the vehicle speed is determined by reference to an x-$V_T$ map. Thereafter, a target value $y_T$ is set through a vehicle speed feedback control based on the I-PD control action as described with reference to FIG. 4 to thereby carry out the throttle control mode based on PID control action. This vehicle speed control is performed in accordance with the following equations:

$$\begin{aligned}
ENV &\leftarrow V_T - V \\
y_T &\leftarrow y_T \div G_4 * ENV \\
&\quad - G_5 * (ENV - ENV1) \\
&\quad - G_6 * (ENV - 2 * ENV1 \\
&\quad \div ENV2) \\
ENV1 &\leftarrow ENV \\
ENV2 &\leftarrow ENV1
\end{aligned}$$

As described above, the value of the vehicle speed deviation ENV1 in the preceding processing cycle is shifted to the address of the vehicle speed deviation ENV in the current processing cycle and the vehicle speed deviation ENV2 in the before-preceding processing cycle to the deviation ENV1. Where the actual vehicle speed is much different from the target vehicle speed $V_T$ at a transitional condition of the vehicle speed control system, the vehicle speed V is corrected to be aligned with the x-$V_T$ control line. Further the control gains $G_4$ through $G_6$ may be reduced so that the response property of control can be softened. In the step 142 of FIG. 10, an x-$V_T$ control map as shown in FIG. 12, in which a control gain for the vehicle speed is reduced in a specific vehicle speed range, can be employed in lieu of the map of FIG. 11 so that a preferred control property can be obtained. In this case, the control gain is reduced under an average speed range or common vehicle speed range, and at a vehicle speed corresponding to an accelerator stroke x when the vehicle speed control is started so that a hunting of the control can be minimized.

According to the vehicle speed control as aforementioned, an effect of the drag can be excluded by correcting the vehicle speed so that running stability at a substantially constant vehicle speed can be accomplished in correspondence with the accelerator stroke.

Figure 13:
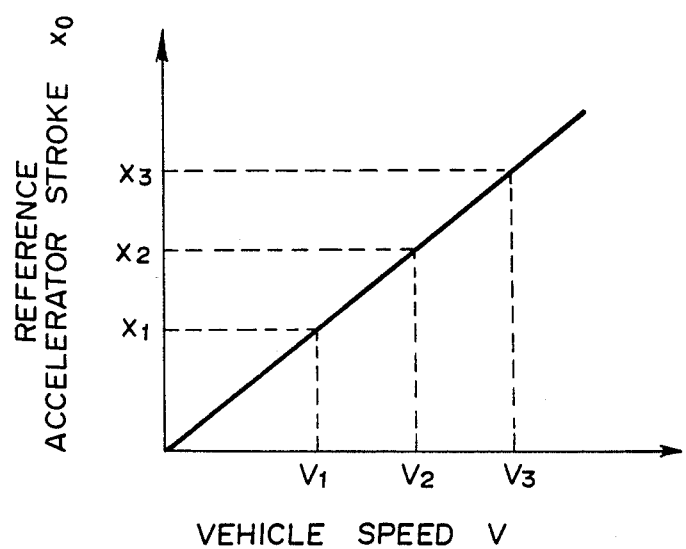
FIG. 13 is a map showing a vehicle speed V and a reference accelerator stroke $x_0$.
Figure 14:
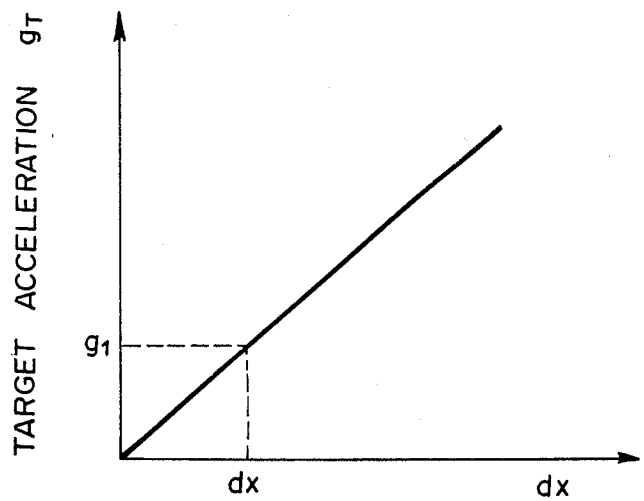
FIG. 14 and FIG. 15 are maps showing an acceleration target value and a charge in the accelerator stroke.

Hereinafter, there is a description with regard to the acceleration control mode for determining a target value $y_T$ of the throttle valve when the step 122 is selected in FIG. 7. In this control, two different control maps are employed. One of the maps is a V-$x_0$ map showing a relationship between a vehicle speed V and a corresponding accelerator stroke x as shown in FIG. 13 and the other is a dx-$g_T$ map showing a relationship between a change in the accelerator stroke dx and a target value $g_T$ of the acceleration as shown in FIG. 14. The V-$x_T$ map provides a control line, which is a so-called zero-line formed by a group of vehicle speed values, each of which provides a constant running condition of the vehicle corresponding to each accelerator stroke wherein the drag force against the vehicle is balanced with a vehicle drive force. Accordingly, the zero-line changes in accordance with a vehicle property such as an air resistance, an output of the engine and the like. The $dx$-$g_T$ map is defined by a difference $dx$ between the current accelerator stroke $x$ and a reference accelerator stroke $x_0$.

It is assumed, that the accelerator stroke is $x_1$ and the vehicle speed is $V_1$ under a vehicle running condition of constant speed wherein the vehicle speed $V_1$ and the accelerator stroke $x_1$ are in the zero-line. If the driver operates the accelerator to increase the stroke from $x_1$ to $x_2$, the accelerator stroke change is provided as $dx_1 = x_2 - x_1$. Accordingly the acceleration target value $g_r$ is obtained as $g_1$ referring to FIG. 14. The control is performed so as to reach the target value $g_T$.

Figure 15:
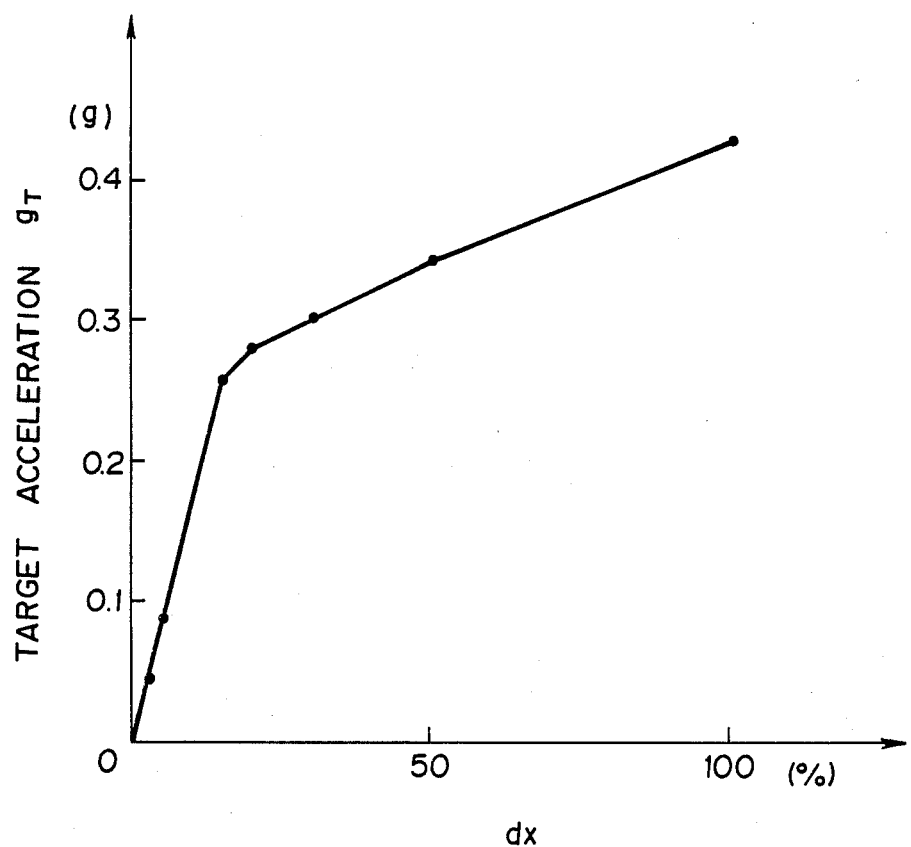

If the driver maintains the accelerator stroke at $x_2$, the acceleration control is so performed that the vehicle speed reaches $V_2$ (positive acceleration control mode). In the case where the vehicle speed is increased to reach a value of $V_3$ when the accelerator stroke is maintained at the value of $x_2$, the corresponding accelerator change $dx_2$ is provided as $dx_2 = x_2 - x_3 < 0$. In this case, the target value $g_T$ is determined in such a manner that the $dx$-$g_T$ map is referred by employing an absolute value of $dx_2$ and the sign of the acceleration value through the map is inverted (deceleration control). It should however be noted that the deceleration value is limited in the deceleration control because of the limitation of the deceleration effect in an engine braking system. The deceleration control is then performed in the same manner as the above acceleration control (negative acceleration control mode). Meanwhile, a $dx$-$g_T$ map as shown in FIG. 15, in which a control gain is reduced in a relatively large range of the acceleration change $dx$, may be used in lieu of the map as shown in FIG. 14. As a result, a depression of the acceleration is reduced to provide the driver with a high acceleration feeling.

Figure 16:
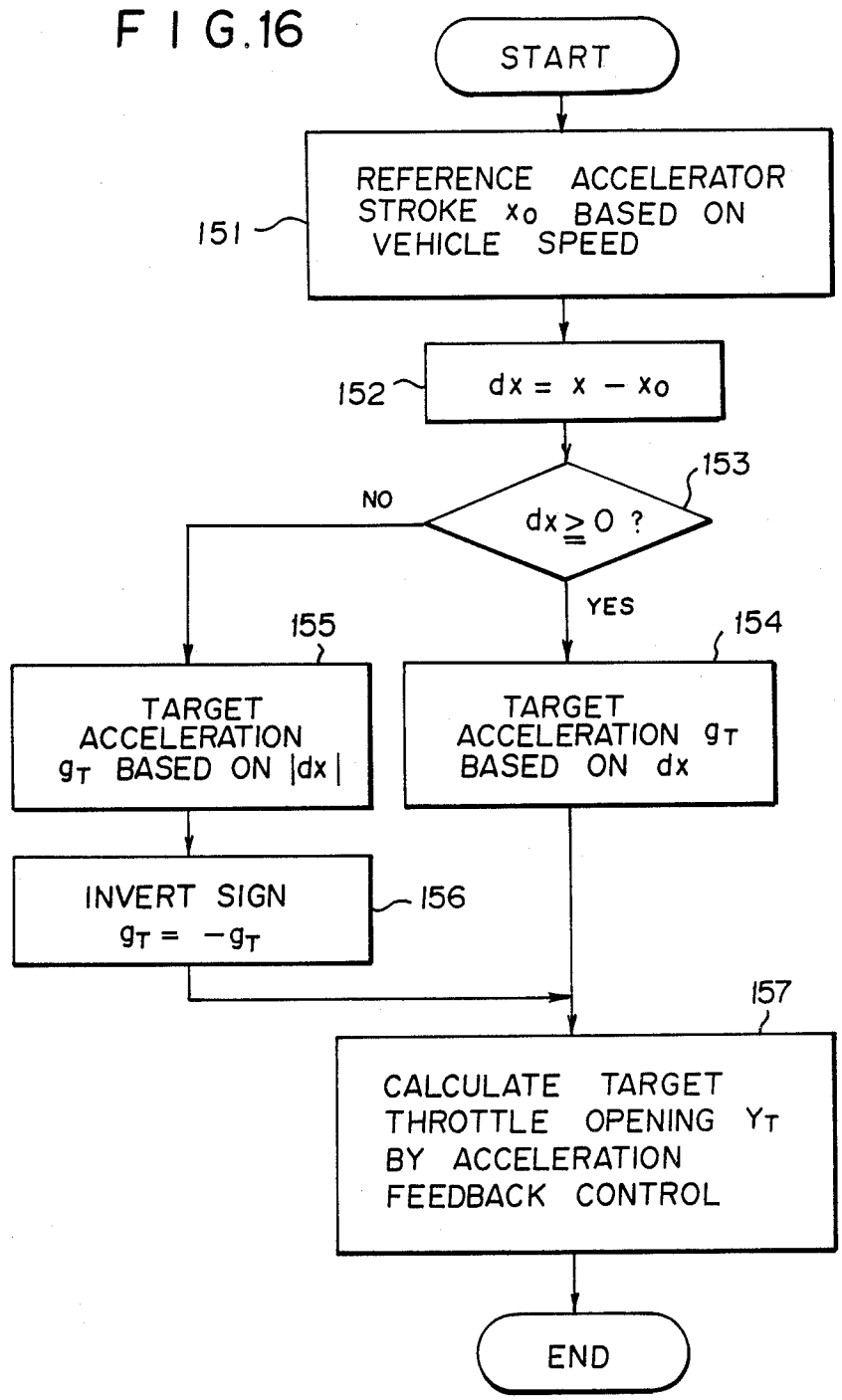
FIG. 16 is a flow chart of the acceleration control.

There is shown a flow chart of the acceleration control as aforementioned in FIG. 16. At first, in step 151, a reference accelerator stroke $x_0$ is obtained with reference to the $V$-$x_0$ map in FIG. 13. Then the difference $dx$ between the current accelerator stroke $x$ and the reference accelerator stroke $x_0$ is calculated in step 152. A judgement is made as to whether or not the difference $dx$ is positive. If the difference $dx$ is positive or zero, step 154 is carried out in which a target value $g_T$ of the acceleration is determined in correspondence to the difference $dx$ through the map in FIG. 13 or FIG. 14. If the difference $dx$ is negative, the absolute value of the difference $dx$ is used to determine an acceleration target value $g_T$ in step 155 by the map in FIG. 13 or FIG. 14. The sign of the value $g_T$ is next inverted in step 156. From step 154 or step 156, step 157 is carried out so that the feedback control (PI-PD control) as shown in FIG. 5 is performed for determining a throttle valve opening target value $y_T$ for the acceleration control (PID control control action). In this acceleration control action, the control equation (9) is employed as described below.

$$\begin{aligned}
ENG &\leftarrow g_T - g \\
y_T &\leftarrow y_T \div G_7 * (ENG - ENG1) \\
&\div G_8 * ENG \\
&- G_9 * (ENG - ENG1) \\
&- G_{10} * (ENG - 2 * ENG1 \div ENG2) \\
ENG1 &\leftarrow ENG \\
ENG2 &\leftarrow ENG1
\end{aligned}$$

For the following processing cycle, the value of the acceleration deviation ENG1 in the preceding processing cycle is shifted to an address of the current acceleration deviation ENG, and the deviation ENG2 in the before-preceding cycle is shifted to the deviation address of the preceeding cycle.

As described above, in the acceleration control, a surplus engine drive force defined by the difference between the drive force and the running resistance or the drag force against the vehicle is detected as a value of the acceleration to thereby perform the vehicle control so that the driver's request for the acceleration can be satisfied effectively. Further the feedback control is employed so that a preferable acceleration property can be obtained. In the transition range from the throttle control mode to the acceleration control mode, the throttle control mode is carried out to thereby reduce a torque shock therein.

In the preferred embodiment as described above, the throttle control mode may be employed when the gear stage is positioned at the reverse stage, engine is disengaged from the transmission system, the throttle valve is closed in a deceleration condition and the vehicle speed is smaller than a predetermined value where the acceleration is smaller than a predetermined value. On the other hand, when the acceleration request is greater than a predetermined level, the acceleration control mode is introduced. As a result, the control modes are changed in accordance with the vehicle running condition so that the optimum control can be accomplished in accordance with the engine operation condition and the driver's request.

Alternatively, the control mode can be changed in accordance with the vehicle speed wherein the throttle control mode is introduced in the low vehicle speed condition and the acceleration control mode in the high speed control mode.

Further, the control mode can be changed in accordance with the gear stage wherein the throttle control mode is employed in the neutral and first stages, the acceleration control mode in the second and third stages, and the vehicle speed control mode in the fourth and fifth stages.

Furthermore, according to the features of the present invention, two control modes may be provided among the throttle, control acceleration control and vehicle speed control modes in order to accomplish an object of the present invention.

Hereinafter, there is described another embodiment of the present invention, referring to FIG. 17.

In this embodiment, control unit 5 is adapted to control the engine by means of the throttle control mode and the vehicle speed control mode. Where the following conditions are satisfied and the control mode of the engine is switched from the throttle control mode to the vehicle speed control mode.

(1) When the vehicle is running at a substantially constant running condition or the throttle valve opening is maintained at a substantially constant value.

(2) When the accelerator is operated to slightly reduce the stroke.

(3) When a gear stage is shifted to a higher gear stage.

On the other hand, where the vehicle is operating in the following conditions, the vehicle speed control is prohibited:

(1) When the vehicle speed is smaller than a predetermined value (for example 10 km/h).

(2) When the clutch is released or half-engaged.

(3) When the gear stage is in the neutral or reverse position.

(4) When the steering wheel is being operated.

(5) When the braking system is being actuated or a brake switch is ON.

(6) When the difference between the vehicle speed target value $V_T$ and the actual vehicle speed V is too great or the throttle valve opening target is out of a control range of 0 to 100% in the opening level.

(7) When the driver turns a vehicle speed control prohibition switch ON and the like.

Figure 17:
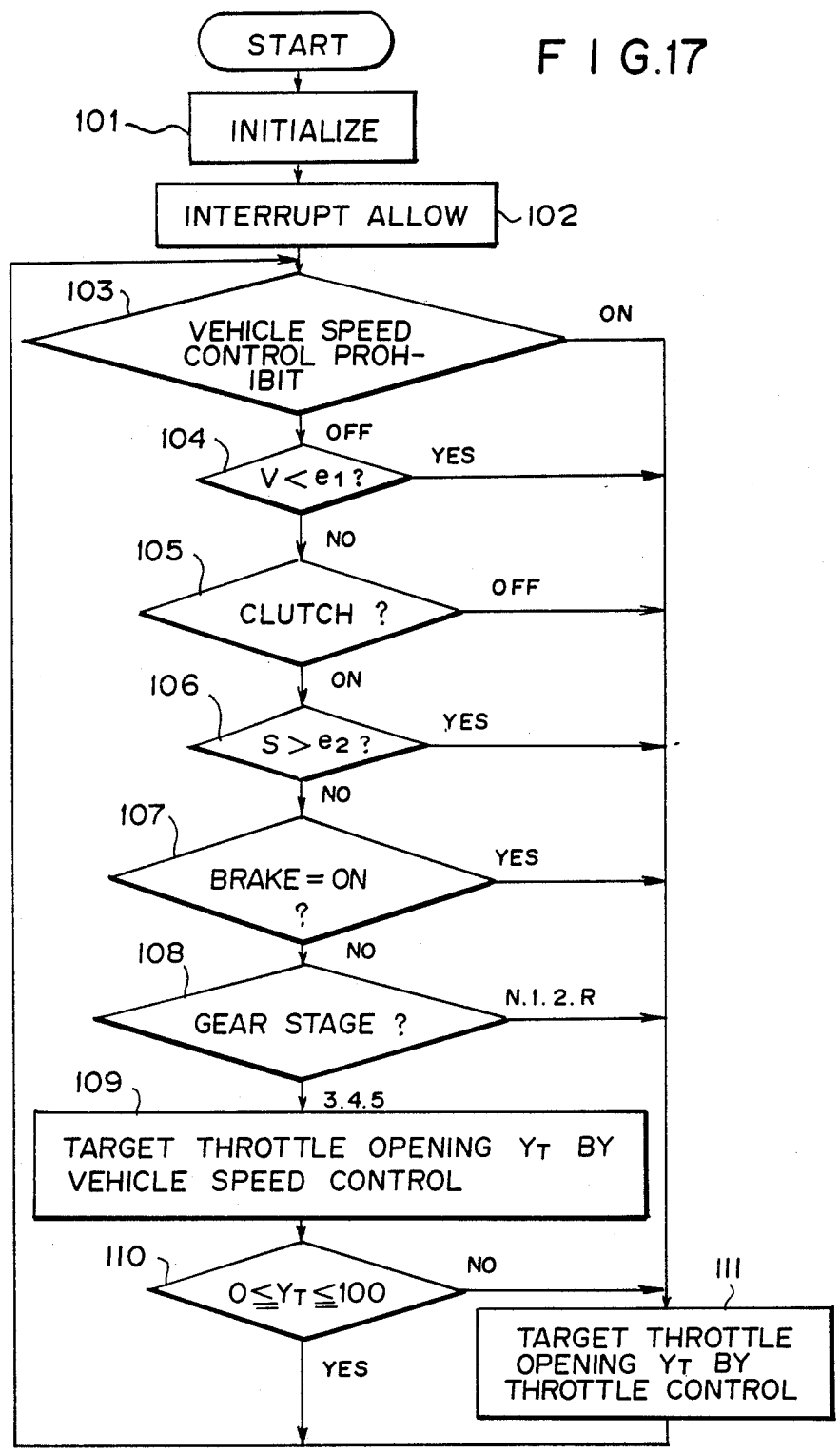
FIG. 17 is a flow chart of a main program in accordance with another embodiment of the present invention.

There is shown a flow chart of a main program carried out by the control unit in FIG. 17.

In FIG. 17, the control unit 5 initializes the system in step 101. In step 102, an interrupt process is allowed. In the next step 103, a judgement is made as to whether the vehicle speed control prohibition switch is turned ON. If the switch is OFF, step 104 is carried out. If the switch is ON, step 111 is carried out in which the throttle valve target value $y_T$ is set through the throttle valve control mode. In step 104, a judgement is made as to whether the vehicle speed is smaller than a predetermined value $e_1$. If the judgement is NO, step 105 is carried out. If the judgement in step 104 is YES, step 111, is carried out in which the throttle control is performed, is carried out. At step 105, a judgement is made as to whether the clutch device is engaged or not. If the clutch device is engaged, the next step 106 is carried out. If the clutch device is half-engaged or disengaged, step 111 is carried out so that the throttle control is performed. In step 106, a judgement is made as to whether or not the steering angle S of the steering wheel is smaller than a predetermined value $e_2$. If the judgement is NO, step 107 is carried out. If the judgement is YES, step 111 is carried out. In step 107, a judgement is made as to whether or not the brake switch is ON. If the judgement is NO, step 108 is carried out. If the judgement is YES, step 111 is carried out and the throttle control is performed. In step 108, a judgement is made as to where the gear stage is. If the gear stage is in the third, fourth, or fifth stage, step 109 is carried out so that the throttle valve target value $y_T$ is set through the vehicle speed control mode. In the next step 110, a judgement is made as to whether or not the the target value $y_T$ resides in the range of 0 through 100% of the throttle valve opening. If the judgement is YES, the procedure is returned back to step 103. If NO, the step 111 is carried and the throttle control is performed.

As for the vehicle speed control system and throttle control system, a detailed description of such systems was made in relation to the preceding embodiment. A duplicate description is avoided in this embodiment.

Hereinafter, there is described a further embodiment of the present invention which is to be considered in conjunction with FIGS. 18, 19 and 20.

In this embodiment, control unit 5 is adapted to control the engine by means of the throttle control mode and the acceleration control mode. Where the following conditions are satisfied, the control mode of the engine is switched from the throttle control mode to the acceleration control mode.

(1) When the gear stage is in a lower stage.

(2) When a shift down operation of the transmission is made.

(3) When the accelerator stroke x is increased so that it is greater than a predetermined value.

(4) When the accelerator operating speed is increased beyond a predetermined value.

(5) Where the road gradient is gentle, and the like.

On the other hand, conditions are switched from the acceleration control system to the throttle control system under the following conditions.

(6) When the gear stage is in the neutral position.

(7) When the clutch is released or half-engaged.

(8) When the braking system is being actuated or a brake switch is ON.

(9) When the steering wheel is being operated.

(10) When the vehicle is running on a rough road on which a slip ratio of the wheels is increased.

(11) When a starting operation and a stop operation of the vehicle is frequently made.

(12) When the driver turns the acceleration control prohibition switch ON.

(13) When the throttle valve opening target value $g_T$ is out of a control range of 0 to 100% in the opening level, and the like.

Figure 18:
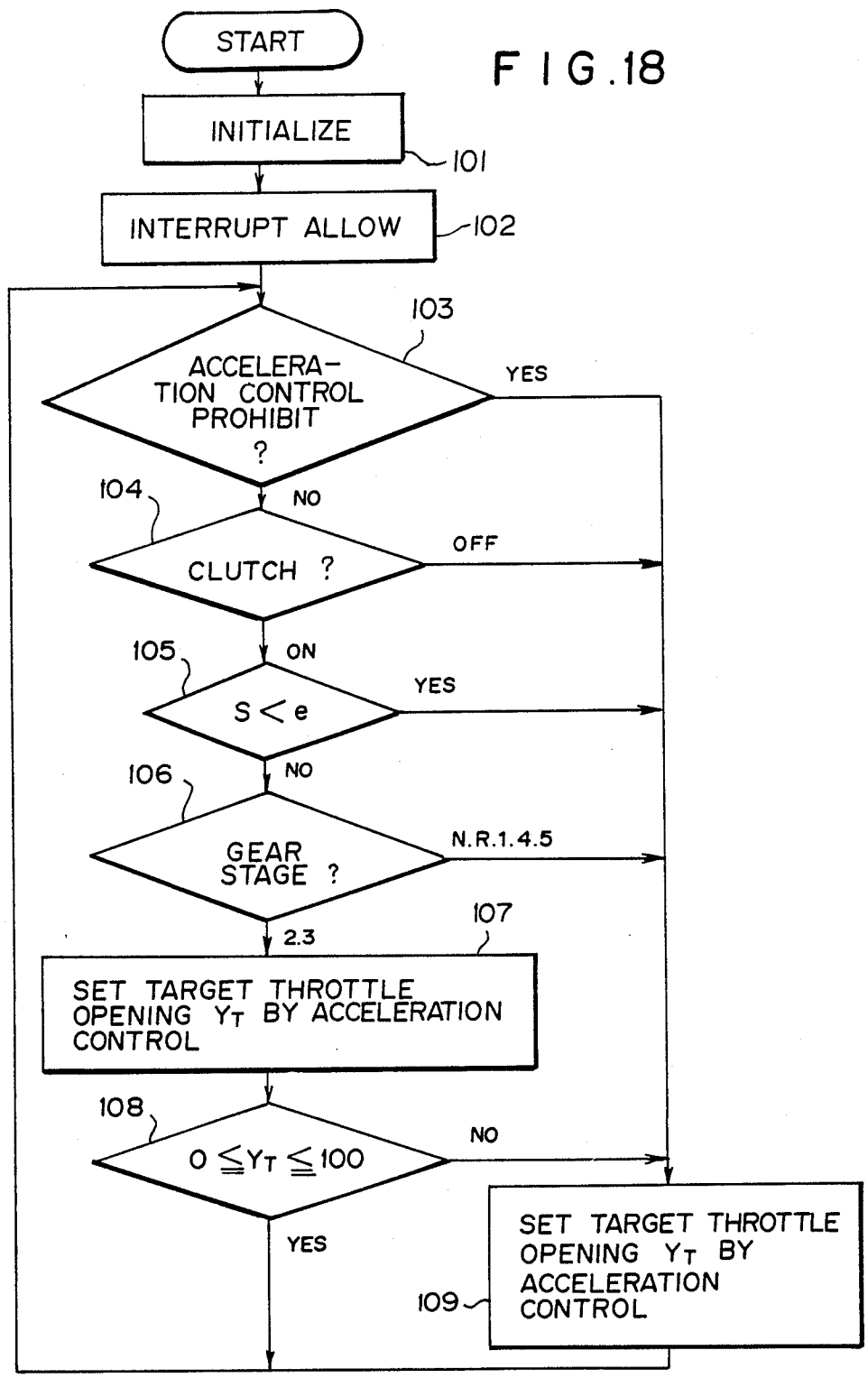
FIG. 18 is a flow chart of a main program in accordance with further embodiment of the present invention.

There is shown a flow chart of a main program carried out by the control unit in FIG. 18 wherein the throttle control mode and the acceleration control mode are selectively performed in accordance with the engine operating condition.

In FIG. 18, the control unit 5 initializes the mode in step 101. In step 102, an interrupt process is allowed. In the next step, 103, a judgement is made as to whether or not the vehicle speed control prohibition switch is turned ON. If the switch is OFF, step 104 is carried out. If the switch is ON, step 109 is carried out in which the throttle valve target value $y_T$ is set through the throttle valve control system. It step 104, a judgement is made as to whether the clutch device is engaged or not. If the clutch device is engaged, the next step 105 is carried out. If the clutch device is half-engaged or disengaged, step 109 is carried out so that the throttle control is performed. In step 105, a judgement is made as to whether the steering angle S is greater than a predetermined value e. If the judgement is NO, the next step 106 is carried out. If the judgement at step 105 is YES, step 109 is carried out in which the throttle control is performed. In the step 106, a judgement is made as to where the gear stage is. If the gear stage is in the second or third stage, step 107 is carried out so that the throttle valve target value $y_T$ is set through the acceleration control mode. In the next step, 108, a judgement is made as to whether or not the the target value $y_T$ resides in the range of 0 through 100% of the throttle valve opening. If the judgement is YES, the procedure is returned back to the step 103. If NO, the step 109 is carried out and the throttle control is performed.

As for the acceleration control mode and throttle control mode, a detailed description of such systems was made in relation to the first embodiment. A duplicate description is avoided in this embodiment.

Figure 19:
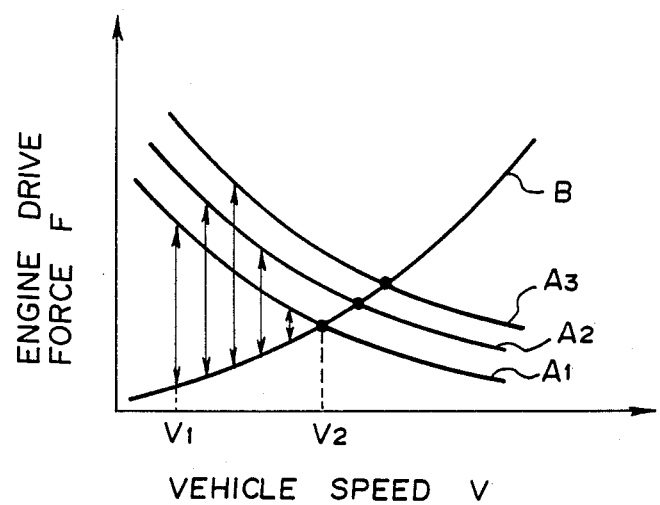
FIG. 19 is a graph showing a relationship among vehicle speed, an engine drive force and a running resistance under an acceleration condition where the acceleration control system is selected.

In FIG. 19, there is shown a relationship between the engine drive force and the running resistance or the drag force against the running vehicle when the acceleration control is performed. According to FIG. 19, when the vehicle speed is increased from $V_1$ to $V_2$, the throttle valve opening is increased so that the engine drive force is gradually increased to a value of $A_1$, $A_2$, and $A_3$ along a line.

Figure 20:
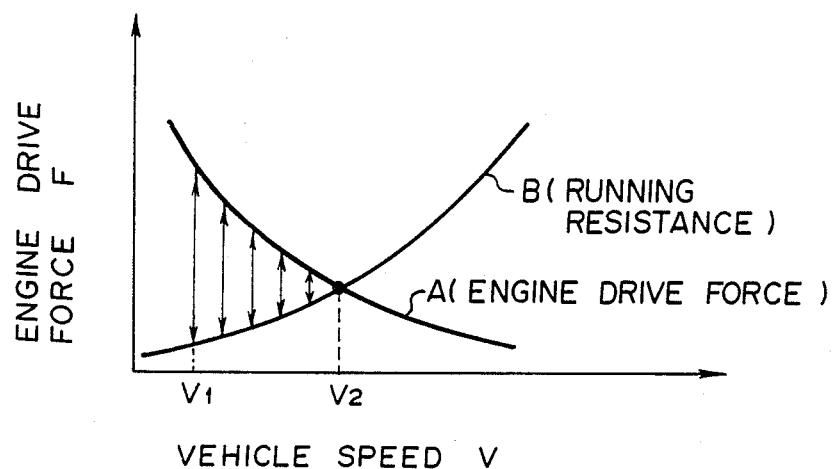
FIG. 20 is a graph showing a relationship among the vehicle speed, the engine drive force and the running resistance.

In FIG. 20, there is shown a relationship between the engine force and the running resistance when the throttle valve control is performed.

As described above, according to the illustrated embodiment, the throttle valve is employed as an engine output control means. However the engine output changing means is not limited to the throttle valve, but the means can be constituted by any means which is adapted to control factors which influence the engine output. Accordingly, the construction of the engine output control means depends on the type of the engine. For instance, in a diesel engine, the amount of the fuel injection is controlled in order to control the engine output so that the engine output control means can be constituted by a fuel control system.

We claim:

1. An engine control system comprising
   engine output changing means for controlling an engine output of at least one of engine power, engine torque and engine speed,
   at least two control means for controlling said engine output changing means selected from direct control means for directly detecting an actual value to which the engine output changing means is operated and setting a target value of the engine output changing means based on an amount an accelerator is operated to thereby adjust the engine output changing means so as to eliminate a difference between the actual value and the target value,
   vehicle speed control means for detecting an actual vehicle speed, setting a target value of vehicle speed based on the amount the accelerator is operated, and for controlling the engine output changing means so as to eliminate a difference between the actual vehicle speed and the target value of vehicle speed,
   acceleration control means for detecting a change in an actual vehicle speed, setting a target value of vehicle acceleration based on the amount the accelerator is operated, and for controlling the engine output changing means so as to eliminate the change in the actual vehicle speed and the target value of vehicle acceleration, and
   selecting means for selecting one of the direct control means, vehicle speed control means and acceleration control means in accordance with a vehicle running condition.

2. An engine control system in accordance with claim 1 wherein
   a throttle valve is driven by the engine output changing means, and the direct control means, vehicle speed control means and acceleration control means control an opening of the throttle valve.

3. An engine control system in accordance with claim 2 in which the direct control means is constituted by a memory which memorizes a throttle valve opening corresponding to an accelerator stroke.

4. An engine control system in accordance with claim 1 wherein one of said direct control means, vehicle speed control means and acceleration control means is selected in accordance with the vehicle running condition.

5. An engine control system in accordance with claim 4 in which the acceleration control means is selected under a vehicle acceleration condition, the vehicle speed control means is selected under a constant vehicle speed condition, and the direct control means is selected under a vehicle running condition other than the vehicle acceleration condition and the constant vehicle speed condition.

6. An engine control system comprising
   engine output changing means for controlling an engine output of at least one of engine power, engine torque and engine speed,
   direct control means for directly detecting an actual value to which the engine output changing means is operated and setting a target value of the engine output changing means based on an amount an accelerator is operated to thereby adjust the engine output changing means so as to eliminate a difference between the actual value and the target value,
   vehicle speed control means for detecting an actual vehicle speed, setting a target value of vehicle speed based on the amount the accelerator is operated, and for controlling the engine output changing means so as to eliminate a difference between the actual vehicle speed and the target value of vehicle speed, and
   selecting means for selecting the vehicle speed control means when the vehicle is under a constant vehicle speed condition and selecting the direct control means under a vehicle running condition other than the constant vehicle speed condition.

7. An engine control system in accordance with claim 6 wherein
   a throttle valve is driven by the engine output changing means, and the direct control means and vehicle speed control means control an opening of the throttle valve.

8. An engine control system in accordance with claim 7 in which the direct control means is constituted by a memory which memorizes a throttle valve opening corresponding to an accelerator stroke.

9. An engine control system in accordance with claim 6 in which the direct control means determines a control value based on a difference between a target value of the engine output changing means obtained through an accelerator stroke and a value corresponding to the actual state of the engine output changing means.

10. An engine control system in accordance with claim 6 in which the constant vehicle speed condition is judged by detecting no change in an acceleration stroke and the vehicle speed.

11. An engine control system comprising
    engine output changing means for controlling an engine output of at least one of engine power, engine torque and engine speed,
    direct control means for directly calculating a control value for the engine output changing means based on an amount an accelerator is operated to thereby control the engine output changing means,
    vehicle speed control means for setting a target value of vehicle speed based on the amount the accelerator is operated for controlling the engine output changing means so as to adjust the vehicle speed to the target value, and
    selecting means for selecting the vehicle speed control means when the vehicle is under a constant vehicle speed condition and selecting the direct control means under a vehicle running condition other than the constant vehicle speed condition,
    the constant vehicle speed condition being judged by detecting no change in the acceleration stroke and the vehicle speed,
    the direct control means being selected when the vehicle speed is smaller than a predetermined value even where the constant vehicle speed condition is detected.

12. An engine control system in accordance with claim 6 in which the vehicle speed control means determines a control value of the engine output changing means based on a value obtained by integrating the difference between a vehicle speed target value and an actual vehicle speed, and a value based on a change in the actual vehicle speed.

13. An engine control system in accordance with claim 6 in which a control value in the vehicle speed control means is determined to have a change in a target vehicle speed relative to a change in the accelerator stroke in a specified running condition smaller in comparison with that relative to a change in the accelerator stroke in other running conditions.

14. An engine control system comprising
engine output changing means for controlling an engine output of at least one of engine power, engine torque and engine speed,
direct control means for directly calculating a control value for the engine output changing means based on an amount an accelerator is operated to thereby drive the engine output changing means
an acceleration control means for setting a target value of vehicle acceleration based on an amount the accelerator is operated for controlling the engine output changing means so as to adjust the vehicle acceleration to the target value, and
selecting means for selecting the acceleration control means in an acceleration condition.

15. An engine control system in accordance with claim 14 wherein
a throttle valve is driven by the engine output changing means, and the direct control means and acceleration control means control an opening of the throttle valve, and the direct control means is constituted by a memory which memorizes a throttle valve opening corresponding to an accelerator stroke.

16. An engine control system in accordance with claim 14 in which the direct control means determines a control value based on a difference between a target value of the engine output changing means obtained through an accelerator stroke and a value corresponding to the actual state of the engine output changing means.

17. An engine control system comprising
engine output changing means for controlling an engine output of at least one of engine power, engine torque and engine speed,
direct control means for directly calculating a control value for the engine output changing means based on an amount an accelerator is operated to thereby drive the engine output changing means,
an acceleration control means for setting a target value of vehicle acceleration based on an amount the accelerator is operated for controlling the engine output changing means so as to adjust the vehicle acceleration to the target value, and
selecting means for selecting the acceleration control means in an acceleration condition,
the acceleration condition being selected when a clutch device is engaged, a gear stage being in a lower gear stage and a steering angle being smaller than a predetermined value.

18. An engine control system in accordance with claim 14 wherein a target value of the vehicle acceleration is determined based on a difference between a reference accelerator stroke determined by current vehicle speed and an actual accelerator stroke so that a property of the target value is in a linear relationship with said difference.

19. An engine control system in accordance with claim 14 in which a ratio of a change in the acceleration target value to a change in the accelerator stroke change is reduced when the change in the accelerator stroke is increased beyond a certain value.

* * * * *